(12) United States Patent
Colon

(10) Patent No.: US 10,139,814 B2
(45) Date of Patent: Nov. 27, 2018

(54) SYSTEM AND METHOD FOR MANUFACTURING A BOARD BODY

(71) Applicant: Performance SK8 Holding Inc., Åkersberga (SE)

(72) Inventor: Becket Colon, Vallentuna (SE)

(73) Assignee: Performance SK8 Holding Inc., Åkersberga (SE)

( * ) Notice: Subject to any disclaimer, the term of this patent is extended or adjusted under 35 U.S.C. 154(b) by 107 days.

(21) Appl. No.: 15/112,999

(22) PCT Filed: Jan. 22, 2015

(86) PCT No.: PCT/SE2015/050059
§ 371 (c)(1),
(2) Date: Jul. 20, 2016

(87) PCT Pub. No.: WO2015/112078
PCT Pub. Date: Jul. 30, 2015

(65) Prior Publication Data
US 2017/0003678 A1    Jan. 5, 2017

(30) Foreign Application Priority Data

Jan. 23, 2014  (SE) ...................... 1450063

(51) Int. Cl.
*G06F 19/00* (2018.01)
*G05B 19/42* (2006.01)
(Continued)

(52) U.S. Cl.
CPC ............ *G05B 19/4207* (2013.01); *A63C 5/12* (2013.01); *A63C 17/017* (2013.01); *B27M 1/08* (2013.01);
(Continued)

(58) Field of Classification Search
CPC ...... G05B 19/4207; G05B 2219/45094; G05B 2219/37572; G05B 2219/36401; B27M 3/22; B27M 1/08; A63C 17/017; A63C 5/12; A63C 2203/42; B27K 5/02
See application file for complete search history.

(56) References Cited

U.S. PATENT DOCUMENTS 3,860,253 A * 1/1975 Schweizer ............... A63C 9/00
280/618
4,101,405 A * 7/1978 Inoue ....................... B23C 1/12
204/224 M
(Continued)

FOREIGN PATENT DOCUMENTS

CN    101890523    11/2010
DE    10116575    11/2001
(Continued)

OTHER PUBLICATIONS

International Search Report and Written Opinion in PCT Case No. PCT/SE2015/050059 dated May 12, 2015.
(Continued)

*Primary Examiner* — Adam Lee
(74) *Attorney, Agent, or Firm* — Knobbe Martens Olson & Bear LLP

(57) ABSTRACT

The present invention relates to a method and a system for manufacturing a board body (10), such as a skateboard, from a blank (20) having an indefinite shape. The blank (20) with the indefinite shape is collected by a handling robot (50). The shape of the blank (20) is scanned in three dimensions by means of a vision system (47) and a virtual image of said blank (20) is stored in a memory and used to calculate a three dimensional cutting path for milling the blank (20) into said board body (10).

14 Claims, 3 Drawing Sheets

(51) Int. Cl.
*A63C 5/12* (2006.01)
*A63C 17/01* (2006.01)
*B27M 1/08* (2006.01)
*B27M 3/22* (2006.01)
*B27K 5/02* (2006.01)

(52) U.S. Cl.
CPC .......... *B27M 3/22* (2013.01); *A63C 2203/42* (2013.01); *B27K 5/02* (2013.01); *G05B 2219/36401* (2013.01); *G05B 2219/37572* (2013.01); *G05B 2219/45094* (2013.01)

(56) References Cited

U.S. PATENT DOCUMENTS

| | | | | |
|---|---|---|---|---|
| 4,268,949 A * | 5/1981 | Sato | ................ | B23Q 3/15713 408/6 |
| 4,617,623 A * | 10/1986 | Inoue | ................ | G05B 19/41 318/567 |
| 4,907,164 A * | 3/1990 | Guyder | ................ | G05B 19/41 700/173 |
| 5,377,116 A * | 12/1994 | Wayne | ................ | G05B 19/4097 700/175 |
| 5,793,375 A * | 8/1998 | Tanaka | ................ | G06T 15/80 345/424 |
| 5,974,168 A * | 10/1999 | Rushmeier | ................ | G06T 7/586 382/141 |
| 6,059,307 A | 5/2000 | Western | | |
| 6,237,486 B1 * | 5/2001 | Firth | ................ | B41F 15/0895 101/123 |
| 6,357,977 B1 * | 3/2002 | Momochi | ................ | B23C 3/00 409/132 |
| 6,549,819 B1 * | 4/2003 | Danduran | ................ | G06T 17/10 700/98 |
| 6,674,918 B1 * | 1/2004 | Liu | ................ | G06T 5/50 345/426 |
| 6,819,319 B1 * | 11/2004 | Fenney | ................ | G06T 15/50 345/426 |
| 6,862,023 B1 * | 3/2005 | Shaikh | ................ | G06T 17/10 345/420 |
| 6,865,442 B1 * | 3/2005 | Jared | ................ | A61F 2/5046 409/132 |
| 6,956,569 B1 * | 10/2005 | Roy | ................ | G06K 9/00208 345/418 |
| 7,006,952 B1 * | 2/2006 | Matsumoto | ................ | A63H 9/00 345/420 |
| 7,062,353 B2 * | 6/2006 | Papiernik | ................ | G05B 19/4069 345/419 |
| 7,347,755 B1 * | 3/2008 | Katzfey | ................ | B63B 7/04 114/352 |
| 9,137,511 B1 * | 9/2015 | LeGrand, III | ................ | G06T 19/006 |
| 2002/0128742 A1 * | 9/2002 | Zieverink | ................ | A44C 27/00 700/159 |
| 2003/0019545 A1 * | 1/2003 | Woodford | ................ | B23D 59/003 144/357 |
| 2003/0040834 A1 * | 2/2003 | Coleman | ................ | G05B 19/4099 700/191 |
| 2003/0083773 A1 * | 5/2003 | Schwanecke | ................ | G05B 19/4069 700/182 |
| 2003/0130757 A1 * | 7/2003 | Kamiya | ................ | G05B 19/4099 700/182 |
| 2003/0219145 A1 * | 11/2003 | Smith | ................ | G06K 9/00577 382/100 |
| 2004/0111178 A1 * | 6/2004 | Saarela | ................ | B44B 3/009 700/193 |
| 2004/0155432 A1 * | 8/2004 | Krumbeck | ................ | A63C 9/0805 280/617 |
| 2004/0214142 A1 * | 10/2004 | Sutula, Jr. | ................ | G09B 25/06 434/151 |
| 2004/0236634 A1 * | 11/2004 | Ruuttu | ................ | G06Q 30/02 705/26.5 |
| 2005/0069682 A1 * | 3/2005 | Tseng | ................ | G05B 19/4099 428/195.1 |
| 2006/0003111 A1 * | 1/2006 | Tseng | ................ | G05B 19/4207 428/16 |
| 2007/0063485 A1 * | 3/2007 | Marega | ................ | A43B 5/0417 280/625 |
| 2007/0187928 A1 * | 8/2007 | Muscatelli | ................ | A63C 10/06 280/620 |
| 2008/0077270 A1 * | 3/2008 | Maier | ................ | A61C 13/0004 700/163 |
| 2008/0213134 A1 * | 9/2008 | Bigus | ................ | B01L 3/502715 422/82.13 |
| 2009/0135181 A1 * | 5/2009 | Chang | ................ | G06T 19/00 345/420 |
| 2009/0171637 A1 * | 7/2009 | Imai | ................ | G06F 17/5018 703/6 |
| 2009/0297020 A1 * | 12/2009 | Beardsley | ................ | G06T 7/521 382/154 |
| 2010/0077690 A1 * | 4/2010 | Durand | ................ | B64C 1/12 52/578 |
| 2010/0085359 A1 * | 4/2010 | Wu | ................ | G06T 15/00 345/426 |
| 2010/0161096 A1 * | 6/2010 | Giudiceandrea | ................ | B27B 1/00 700/98 |
| 2010/0185309 A1 * | 7/2010 | Ohiaeri | ................ | G06Q 30/0603 700/98 |
| 2010/0228380 A1 * | 9/2010 | Giudiceandrea | ................ | B27B 1/00 700/118 |
| 2010/0274375 A1 * | 10/2010 | Daum | ................ | G05B 19/4097 700/98 |
| 2010/0298961 A1 | 11/2010 | Frisken et al. | | |
| 2010/0332438 A1 * | 12/2010 | Toland | ................ | G06F 17/5009 706/52 |
| 2011/0009993 A1 * | 1/2011 | Chuang | ................ | G05B 19/4097 700/98 |
| 2011/0050854 A1 * | 3/2011 | Kanamori | ................ | H04N 13/025 348/46 |
| 2011/0311107 A1 * | 12/2011 | Levesque | ................ | G06L 7/0073 382/106 |
| 2012/0079377 A1 * | 3/2012 | Goossens | ................ | G06F 3/04815 715/706 |
| 2012/0179285 A1 * | 7/2012 | Melzer-Jokisch | ................ | B23P 6/007 700/164 |
| 2012/0197422 A1 * | 8/2012 | Ohiaeri | ................ | G06F 17/50 700/98 |
| 2012/0256395 A1 * | 10/2012 | Ritter | ................ | A63C 5/02 280/623 |
| 2013/0019477 A1 * | 1/2013 | Blais | ................ | B23C 3/18 29/889.7 |
| 2013/0197683 A1 * | 8/2013 | Zhang | ................ | B22F 3/1055 700/96 |
| 2013/0297064 A1 * | 11/2013 | Sherbrooke | ................ | B23Q 15/22 700/190 |
| 2013/0345853 A1 | 12/2013 | Berman et al. | | |
| 2014/0081440 A1 * | 3/2014 | Luisi | ................ | A61F 5/05891 700/98 |
| 2014/0121819 A1 * | 5/2014 | Amidon | ................ | G05B 19/4097 700/173 |
| 2014/0375009 A1 * | 12/2014 | Willis | ................ | A63C 17/017 280/87.042 |
| 2015/0066191 A1 * | 3/2015 | Yasukochi | ................ | G05B 19/4069 700/160 |

FOREIGN PATENT DOCUMENTS

| | | |
|---|---|---|
| EP | 0496968 | 8/1992 |
| EP | 2095922 | 9/2009 |
| WO | WO 0029080 A1 | 5/2000 |
| WO | WO 2010022404 A1 | 2/2010 |

OTHER PUBLICATIONS

"Printing Method Penetrates Skateboard", Machine Design, Penton Media, Cleveland, OH, US, vol. 65, No. 2, Jan. 22, 1993 (Jan. 22, 1993), p. 14.

* cited by examiner

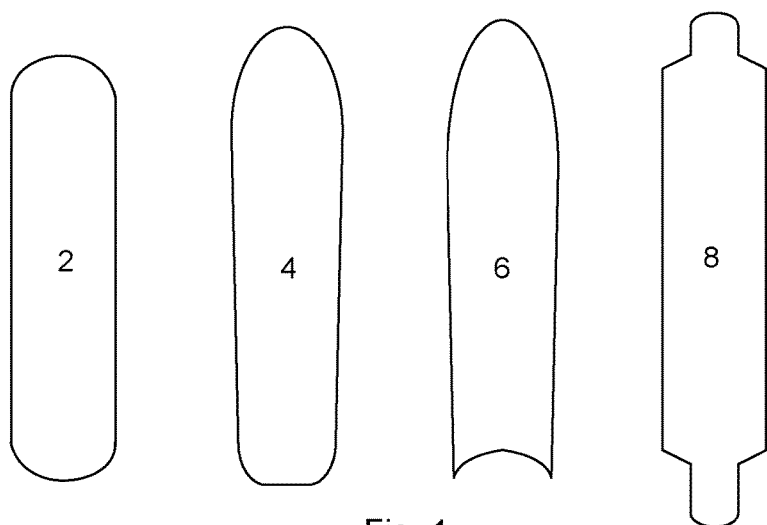
Fig. 1
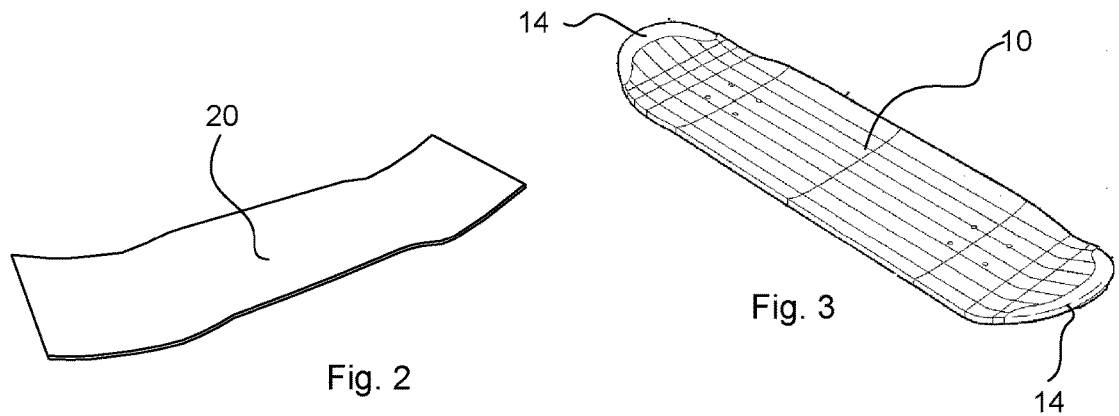
Fig. 2
Fig. 3
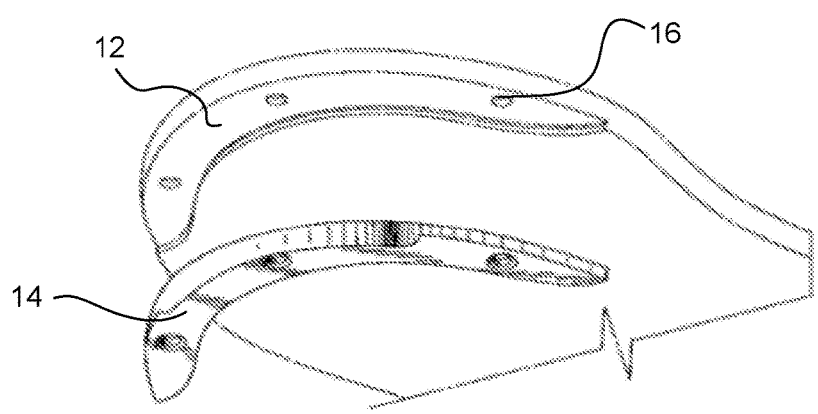
Fig. 4

SYSTEM AND METHOD FOR MANUFACTURING A BOARD BODY

CROSS REFERENCE TO RELATED APPLICATIONS

This application is a U.S. National Phase Application of PCT International Application Number PCT/SE2015/050059, filed on Jan. 22, 2015, and designating the United States of America and published in the English language, which claims priority to Sweden Patent Application number 1450063-1, filed Jan. 23, 2014. The disclosures of the above-referenced applications are hereby expressly incorporated by reference in their entireties for all purposes.

TECHNICAL FIELD

The present invention relates to a system and a method for manufacturing a board body from a blank having an indefinite shape.

BACKGROUND

When manufacturing different types of board bodies such as skateboards, wakeboards, snowboards, skimboards, snowskates, surf boards etc one begins with wood in the form of a vertically laminated core or a cross laminated veneer, which is pressed and formed into a substantially rectangular three dimensional concave shape called an uncut blank or hereinafter blank. Since the blank is made of a wooden raw material and sometimes multiple blanks are pressed at the same time in the same mold, the shape of the blank will vary depending on the placement of the bank in the mold, furthermore the shape of the blank can change after pressing due to the surrounding conditions, such as temperature and humidity. The varying shape will be a challenge when manufacturing the board body since the starting material has an indefinite shape.

If one takes a skateboard as an example the material that is used for producing skateboards is soft maple or some other wooden material that will be affected by temperature and humidity as mentioned above. This means that each blank from which the skateboard is manufactured will have an individual or indefinite shape. The skateboards of today are therefore handmade such that the variations of the blank are taken into account. However not even the handmade skateboards do always meet high requirements regarding accuracy.

Regarding skateboards there have the last couple of years also come skateboards into the market provided with fittings provided at the rear and the front end. Such fittings complicate the production of boards as milling the fitting requires a great degree of accuracy.

In order to produce skateboards equipped with fittings or the like in the area of the nose and tail a recess is provided at the nose and tail of the skateboard such that when the fitting is mounted onto the skateboard it is flush with rest of the riding surface of the skateboard. The element which is mounted in the fitting is made from a material that has a lower mechanical damping capacity and a higher modulus of elasticity than the rest of the skateboard body. Such a skateboard is closer described in European Patent no. 1 156 858B1. The fitting is exchangeable and may be changed when worn down and thus prolongs the functional life of the skateboard. Instead of exchanging the entire body or blank of the skateboard it is enough to replace the fitting or fittings without deteriorating the properties of the skateboard. A similar patent for skimboards is described in U.S. Pat. No. 3,481,619.

The use of fittings has not only manifestly changed the life span for skimboards and skateboards, but also for skateboards provided improved performance via a more foreseeable pop when performing the prerequisite maneuver in modern skateboarding tricks, i.e. an ollie. However, compared to manufacturing traditional skateboards without any fittings, the manufacturing of these new skateboards is even more complicated. The reason for this is that the recess into which the fitting will engage requires milling with high precision.

Thus, there is a need for a method and also a system for manufacturing different types of boards, such as skateboards, wakeboards, snowboards, skimboards and snowskates, etc. with a high degree of accuracy and also with a high degree of efficiency.

SUMMARY

An object with embodiments of the present invention is to provide a method and a system with which the manufacturing accuracy and efficiency may be enhanced.

According to a first aspect of the invention the object may be achieved by a method for manufacturing a board body, such as a skateboard, from a blank having an indefinite shape. The method comprises collecting by means of a handling robot, the blank with the indefinite shape from a loading area, moving the blank to a scanning area, scanning the shape of the blank in three dimensions by means of a vision system and storing a virtual image of said blank in a memory, calculating a three dimensional cutting path for milling the blank into said board body based on said virtual image of the blank, moving the blank to a machining area by means of the handling robot and milling the blank, by means of a machining robot, into the board body.

In a preferred embodiment of the present invention the step of milling further comprises, by means of the machining robot, milling a recess into the board body at a front and/or at a rear of said body, wherein each recess is adapted to receive a fitting.

In another preferred embodiment of the present invention the board body is also printed with an individual image. To this end there is provided a method further comprising steps for identifying surface normals of the blank by using the virtual image, and printing an image onto the blank, by means of a printing robot, by aligning a printing head of the printing robot based on the identified surface normals such that said printing head is carried parallel to the surface of the blank during printing. This printing step may according to exemplary embodiments be performed prior to the milling step.

In yet another preferred embodiment of the present invention the printing is performed after the milling operation. I such a case the method further comprises scanning the shape of the board body in three dimensions by means of the vision system and storing a virtual image of said board body in a memory, identifying surface normals of the board body by using the virtual image, and printing an image onto the board body, by means of a printing robot, by aligning a printing head of the printing robot based on the identified surface normals such that said printing head is carried parallel to the surface of the board body during printing.

In yet another preferred embodiment the method further comprises marking the blank with a unique identity.

According to another aspect of the invention the object may be achieved by a system for manufacturing a board body, such as a skateboard, from a blank having an indefinite shape. The system comprises a loading area, a handling robot, a scanning area, a vision system, a machining area and a machining robot and is configured to perform the method according to the first aspect described above.

In a preferred embodiment the system may further comprise a printing robot for printing an image onto the blank or onto the board body. If the printing robot prints the image after the blank has been milled the system is further configured to perform a new scan, now of the shape of the board body, in order to create a new virtual image for the printing robot.

The system may further comprise a laser arranged on the handling robot and configured to mark the blank with a unique identity.

By determining the exact shape of the blank prior to the milling operation it is possible to increase both the accuracy and efficiency of manufacturing a board body.

BRIEF DESCRIPTION OF THE DRAWINGS

These and other aspects, features and advantages of embodiments of the present disclosure will be apparent and elucidated from the following description of various embodiments, reference being made to the accompanying drawings, in which:

FIG. 1 is a schematic view of different type of skateboards;

FIG. 2 is a perspective view of a blank;

FIG. 3 shows a perspective view of a typical shape of a kicktail concave skateboard;

FIG. 4 is a bottom rear view of a fitting for a skateboard and a partial view of the skateboard;

DETAILED DESCRIPTION

Figure 5:
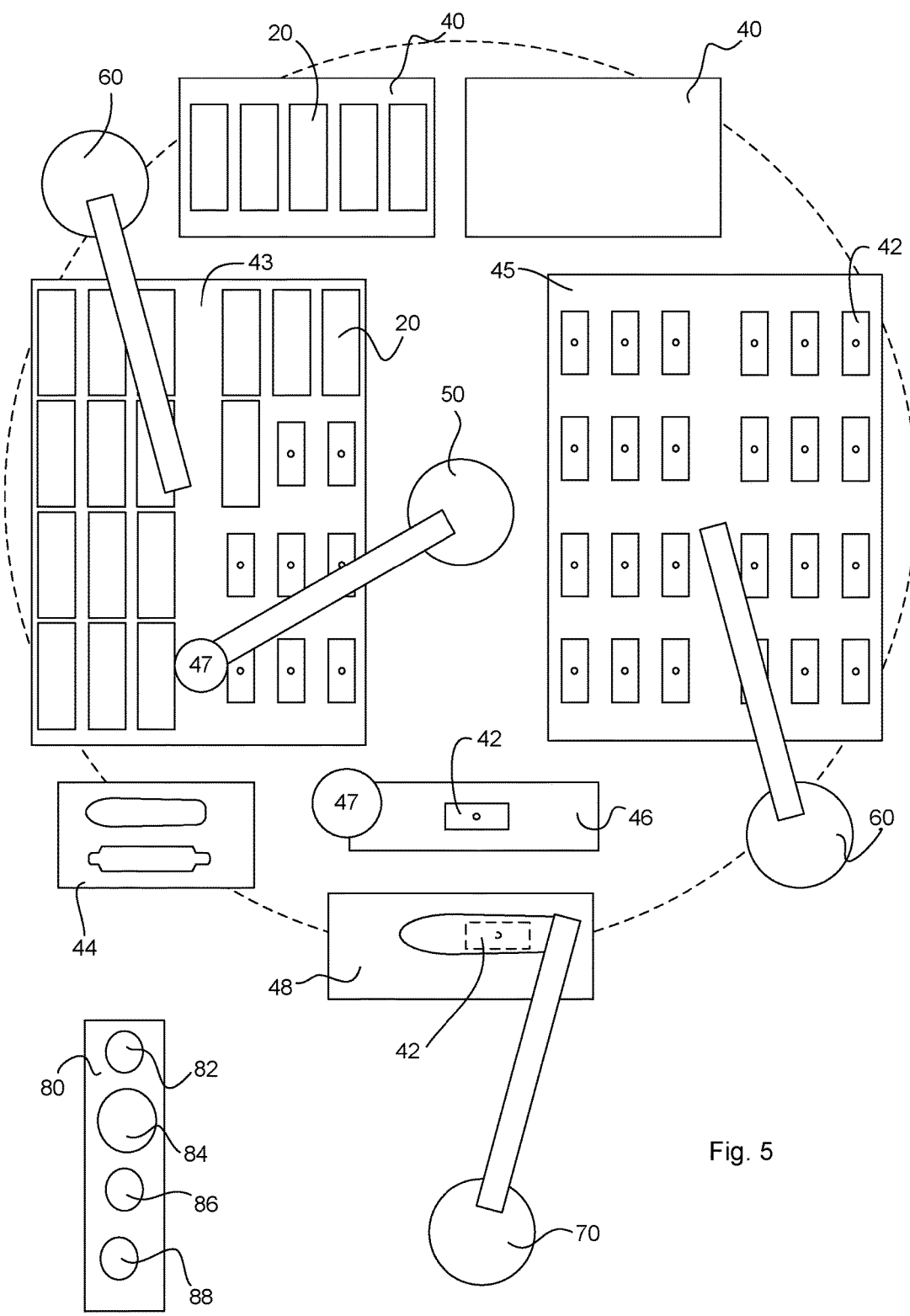
FIG. 5 is a schematic view of the system for manufacturing a skateboard.

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Before the method and system for manufacturing board bodies according to the present invention is described in more detail a short overview of different type of skateboards will be made. Different types of skateboards will be used to illustrate the present invention. However it should be understood that any type of board body, such as skateboards, wakeboards, snowboards, skimboards, snowskates, surf boards, etc. may be manufactured with the method and system according to the present invention. It is believed that the type of skateboard described in the example, i.e. a skateboard with recesses at the rear and/or the back of the skateboard are the most complex to manufacture and therefore is illustrative for all types of boards.

Thus, FIG. 1 shows different types of skateboards which may be manufactured with the method and system of the present invention. Reference number 2 denotes a street skateboard, reference number 4 a park or transition skateboard, reference number 6 a longboard and reference number 8 a drop through longboard. The size of a skateboard may vary between 15 to 30 cm in width and 70 to 150 cm in length. FIG. 2 is a perspective view of a blank 20. The present invention is especially useful for kicktail concave skateboards 10, the basic shape of which is shown in FIG. 3. This means that the skateboard has an upwardly inclined end portion and a concave riding portion. In FIG. 3 the skateboard 10 is also provided with fittings 14. As mentioned above in the background the fittings 14 are used to protected the front and the rear of the skateboard when performing an ollie. In FIG. 4 an enlarged view of the rear end of the skateboard is shown. The fitting 14 is shown in a demounted state and a corresponding recess 12 into which the fitting is to be inserted is also clearly shown. Such a recess 12 may be provided both on the upper and the lower side of the skateboard depending on the shape of the fitting. In such a case the fitting would be more U-shaped, such as shown in for example EP 1 156 858B1, which discloses several types of fittings. In order to fasten the fittings in a removable way on the skateboard there are holes 16 provided in the recess 12, such that the fitting may be screwed onto the recess 12 of the skateboard.

Turning now to FIG. 5 the system according to the present invention will be described. The system comprises a loading area 40, a handling robot 50, a first printing cell 43, a second printing cell 45, two printing robots 60, a visual system 47, a scanning area 46, a machining area 48, a machining robot 70, a tool storing area 80 and an output area 44. It is to be understood that the all the robots in the system are computer controlled and may be programmed in many different ways in order to perform the method steps according to the present invention. It is believed to be within the ability of a person skilled in the art to perform such programming in light of what is described in the present disclosure.

There may be one or more loading areas 40 depending on the desired production capacity of the system. In the loading area 40 pallets provided with blanks 20 are entering into the manufacturing cell, the main area of which is shown with dotted lines. The pallets may be arranged in a carousel containing eight pallets with different types of blanks for producing different types of skateboards. The carousel will rotate in a circle until the correct pallet of blanks 20 is reached, i.e. the type of blank 20 of which the skateboard deck will be manufactured from.

The handling robot 50 may be a six-axial robot and is used for moving the blanks 20 between different areas in the manufacturing cell, i.e. to and from the loading area, the first and second printing area 43 and 45, the scanning area 46, the machining area 48 and the output area 44. In some embodiments of the present invention the handling robot 50 may be equipped with a laser vision system 47 for scanning the pallets of uncut skateboard blanks in order to indentify the blank which is to be used to manufacture next skateboard body 10. The vision system 47 may also be used for creating a three dimensional virtual image of said blank, which virtual image will be used later on when cutting, printing and/or milling the blank. In another embodiment the vision system 47 is instead provided in the scanning area 46 and the handling robot 50 is used to transport the blank 20 or when applicable the skateboard body 10 to and from the scanning area 46. In context of the present invention a blank 20 is an unprocessed piece and a skateboard body or board body is the blank after all machining steps, such as milling, drilling, sanding and finishing have been performed on the blank.

The first and second printing area 43 and 45 respectively, may each be divided into two zones having 12 places each for receiving a blank 20 or a skateboard body 10. The printing areas 43 and 45 are provided with fixtures 42 adapted to receive and hold the blanks 20 or the skateboard bodies during a printing process to be described below. The printing areas 43 and 45 are each served by a printing robot 60.

The machining robot 70 is also a six-axis robot and is used for machining the blank 20 into a skateboard body 10. The machining is performed in the machining area 48. Since the machining robot 70 is configured to perform different machining operations, such as drilling, milling, sanding and finishing the tool storing area 80 is provided within the reach of the machining robot 70. The tool storing area 80 stores different tools 82-88.

As mentioned above the system also comprises the output area 44 in which the finished skateboard bodies 10 are buffered before they are shipped further to end costumers. Thus the system of the present invention has been described. In order to better understand the different functions of the system a method for manufacturing the skateboard body 10 will be described in conjunction with FIG. 6.

Figure 6:
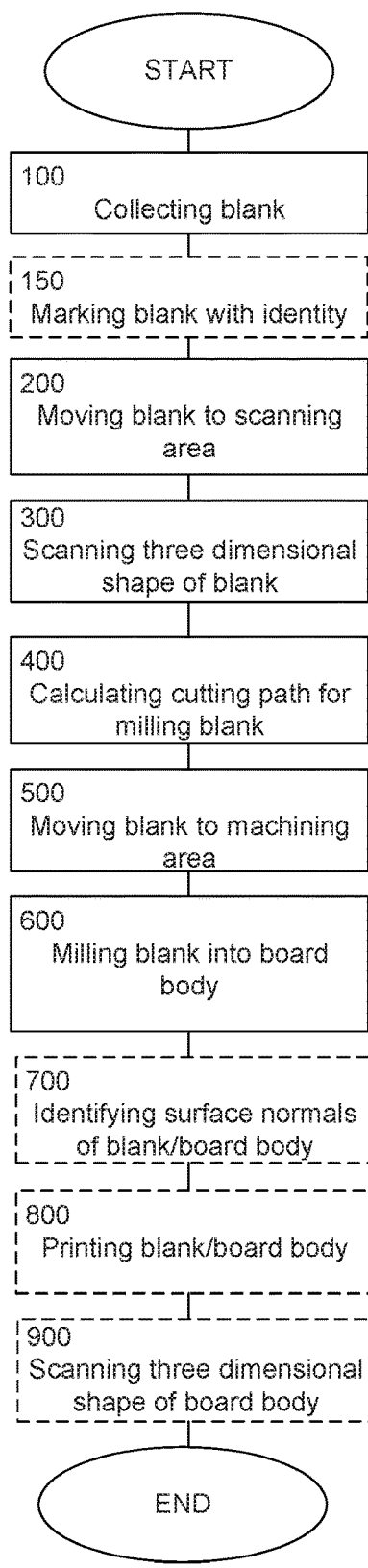
FIG. 6 is a flow chart showing the method according to the present invention, with optional steps marked with dotted lines.

FIG. 6 is a flow chart showing the method according to the present invention, with optional steps marked with dotted lines. It is to be understood that the present invention is directed towards the manufacturing of a board body 10 from a blank having a indefinite shape. In a preferred embodiment the board body nay be a skateboard body with a recess 12 at a front and/or at a rear of said body and each recess 12 is adapted to receive a fitting 14 as mentioned above.

The method starts with step 100, in which the handling robot 50 collects the blank 20 from the loading area 40. As mentioned above each blank has a unique and individual shape which has to be known by the system in order for properly machining the blank 20 into a skateboard body. As mentioned above the handling robot 50 may be provided with a visual system 47 in order to identify a suitable blank for the next board body 10 to be produced. If the handling robot 50 does not have a vision system 47 the handling robot 50 may instead move, in step 200, the blank 20 to the scanning area 46 and use the vision system 47 provided at this scanning area 46. In step 300 the shape of the blank 20 is scanned in three dimensions by means of the vision system 47 in order to create a three dimensional virtual image of the blank 20. Independently of how the virtual image was created that is through the vision system 47 arranged on the handling robot 50 or the vision system 47 at the scanning area 46 the image is stored for later use. In context of the present invention it should be understood that the scanning area 46, where the blank is scanned may by the area around the handling robot 50 if the vision system is provided on the handling robot 50.

After collecting the blank 20 from the loading area 40 and when the blank 20 has been securely fixed to a fixture 42 either in the first or second printing area 43 and 45, the scanning area 46 or the machining area 48, the handling robot 50 marks, in step 150, the blank 20 with a unique identity and other information. Such information may for example be the name of the client ordering the skateboard, the laminate construction, the shape number, the surface number, the length, the width, the wheelbase, the nose length, the tail length, the nose TIP number, the tail TIP number, the date and time of manufacturing. Step 150 is an optional step.

After storing the virtual three dimensional image, this data will be used for calculating, in step 400, a three dimensional cutting path for milling the blank 20 into the skateboard body. In step 500 the handling robot 50 moves the blank 20 to the machining area 48 in which the machining robot 70 mills, in step 600, the blank 20 into the board body including said at least one recess 12. If the machining robot 70 needs to change tools 82-88 or replace a worn out tool the machining robot 70 moves to the tool storing area 80 and changes tool. Thus by performing steps 100-600 it is possible to manufacture a skateboard body 10 from a blank 20 with high accuracy and efficiency. This is due to the fact that each individual shape of the blank is recognized and taking into account when producing the skateboard body. Furthermore by using the system according to the present invention it is also possible to create a very flexible manufacturing system where the end user, i.e. the rider of the any board may customize his on board body by selecting different parameters when ordering his board. All this may be done without the reprogramming the machining robot 70 for each produce board. The machining robot 70 may use the same Computer-Aided Manufacturing, CAM, file which is capable to use the input from the vision system 47, i.e. the shape of the blank 20, and the user selected parameters in calculating the three dimensional cutting path for the machining robot 70. As will be explained below it is also possible according to preferred embodiments of the present invention to print an individualized image on the board body.

As mentioned above the system may as an option also provide for printing an image onto the board body. The printing is performed in either the first or the second printing area 43 and 45. The reason why two printing areas are used in this exemplary embodiment is that it will increase the manufacturing capacity; when one printing area is occupied with printing the blanks or board bodies by means of the printing robot 60, the other printing area may be unloaded and then loaded with new pieces by the handling robot 50. It is of course also possible to use one or more than two printing areas depending on the desired capacity of the system. The printing operation may be performed either before the blank 20 is machined or after the blank has been machined into the board body. In the first case the printing operation starts with identifying, in step 700, the surface normals of the blank 20 by using the stored virtual image, and then in step 800 printing an image onto the blank, by means of the printing robot 60. This is done by aligning a printing head of the printing robot 60 based on the identified surface normals such that said printing head is carried parallel to the surface of the blank 20 during the printing of the image printing.

In the case where the image is printed on the board body, i.e. after the blank 20 has been machined into the board body, a further step is needed since the stored virtual image of the blank is no longer valid. The stored virtual image relates to the blank and not to the board body. Therefore in step 900 scanning of the shape of the skateboard body 10 in three dimensions by means of the vision system 47 is performed and a virtual image of said board body 10 is stored in a memory. Thereafter the same steps as above for printing the blank 20 are performed. Thus in step 700 the surface normals of the board body are identified using the new virtual image and then the image is printed in a corresponding way as for the blank.

Thus, it is believed that different embodiments have been described thoroughly for purpose of illustration and description. However, the foregoing description is not intended to be exhaustive or to limit example embodiments to the precise form disclosed. Thus, modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should also be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software, and that several "means", "units" or "devices" may be represented by the same item of hardware.

The invention claimed is:

1. A method for manufacturing a board body from a blank, the blank having a three dimensional shape comprising a concavity, the method comprising:
   collecting, with a handling robot, the blank having the three dimensional shape comprising the concavity from a loading area;
   moving the blank to a scanning area;
   scanning the three dimensional shape of the blank in three dimensions with a vision system, wherein the scanning produces a three dimensional virtual image of the blank;
   storing the three dimensional virtual image of the blank in a memory;
   calculating a three dimensional cutting path for milling the blank into the board body based on the three dimensional virtual image of the blank and user-selected parameters;
   moving the blank to a machining area with the handling robot; and
   milling the blank, along the three dimensional cutting path, with a machining robot configured to perform a milling machining operation, into the board body.

2. The method according to claim 1, further comprising:
   milling, with the machining robot, a recess into the board body at a front and/or at a rear of the board body, each recess being adapted to receive a fitting.

3. The method according to claim 1, further comprising:
   identifying surface normals of the blank by using the three dimensional virtual image; and
   printing an image onto the blank, with a printing robot, by aligning a printing head of the printing robot based on the identified surface normals such that the printing head is carried parallel to the surface of the blank during printing.

4. The method according to claim 1, further comprising:
   scanning the shape of the board body in three dimensions with the vision system;
   storing a virtual image of the board body in the memory;
   identifying surface normals of the board body using the virtual image; and
   printing an image onto the board body, with a printing robot, by aligning a printing head of the printing robot based on the identified surface normals such that the printing head is carried parallel to the surface of the board body during printing.

5. The method according to claim 1, further comprising marking the blank with a unique identity.

6. The method according to claim 1, wherein the board body is a skateboard.

7. The method according to claim 1, wherein the machining robot is a multi-axis machining robot.

8. The method according to claim 7, wherein the multi-axis machining robot is a six-axis machining robot.

9. A system for manufacturing a board body from a blank, the blank having a three dimensional shape comprising a concavity, the system comprising a loading area, a handling robot, a scanning area, a vision system, a machining area and a machining robot, the machining robot configured to perform a milling machining operation, the system configured to:
   collect, with the handling robot, the blank with the three dimensional shape comprising the concavity from the loading area;
   move the blank to the scanning area;
   scan the three dimensional shape of the blank in three dimensions with the vision system, wherein the scan produces a three dimensional virtual image of the blank;
   store the three dimensional virtual image of the blank in a memory;
   calculate a three dimensional cutting path for milling the blank into the board body based on the three dimensional virtual image of the blank and user-selected parameters;
   move the blank to the machining area with the handling robot, and
   mill the blank along the three dimensional cutting path, with the machining robot, into the board body.

10. The system according to claim 9, the system further configured to:
    mill, with the machining robot, a recess into the board body at a front and/or at a rear of the body, each recess being adapted to receive a fitting.

11. The system according claim 9, further comprising a printing robot, the system further configured to:
    identify surface normals of the blank by using the three dimensional virtual image; and
    print an image onto the blank, with the printing robot, by aligning a printing head of the printing robot based on the identified surface normals such that the printing head is carried parallel to the surface of the blank when printing.

12. The system according claim 9, further comprising a printing robot, the system further configured to:
    scan the shape of the board body in three dimensions with the vision system;
    store a virtual image of the board body in the memory;
    identify surface normals of the board body by using the virtual image; and
    print an image onto the board body, with the printing robot, by aligning a printing head of the printing robot based on the identified surface normals such that the printing head is carried parallel to the surface of the board body when printing.

13. The system according to claim 9, further comprising a laser arranged on the handling robot, the system further configured to mark the blank with a unique identity.

14. The system according to claim 9, wherein the board body is a skateboard.

* * * * *